3,128,283
Patented Apr. 7, 1964

1

3,128,283
17-OXYGENATED OXA-STEROIDS AND
INTERMEDIATES THERETO
Raphael Pappo, Skokie, Ill., assignor to G. D. Searle &
Co., Chicago, Ill., a corporation of Delaware
No Drawing. Filed Dec. 11, 1961, Ser. No. 158,577
Claims priority, application Mexico May 10, 1961
20 Claims. (Cl. 260—343.2)

The present invention is concerned with novel steroidal lactones and, more particularly, with 17-oxygenated androstane and estrane derivatives in which the A ring contains a lactone structure. These lactones can be represented by the structural formula

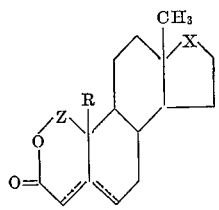

in which R can be hydrogen or a methyl radical, Z can be a

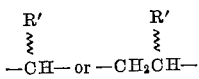

radical, wherein R' is hydrogen or a lower alkyl radical attached to the carbon atom adjacent to the oxygen atom, and the wavy line indicates the alternative α or β stereochemical configuration, X is a carbonyl, β-hydroxymethylene, β-(lower alkanoyl)-oxymethylene, α-(lower alkyl)-β-hydroxymethylene, or α-(lower alkyl)-β-(lower alkanoyl)oxymethylene radical, and the dotted lines indicate the optional presence of a 4,5 or 5,6 double bond.

The lower alkyl radicals included in the foregoing structural representation are exemplified by methyl, ethyl, propyl, butyl, pentyl, hexyl, and the branched-chain isomers thereof. Lower alkanoyl radicals comprehended in the X term of that formula are, for example, formyl, acetyl, propionyl, butyryl, valeryl, caproyl, and the branched-chain radicals isomeric therewith.

This application is a continuation-in-part of my copending application, Serial No. 29,594, filed May 17, 1960, now abandoned.

A preferred object of this invention is to provide compounds of the structural formula

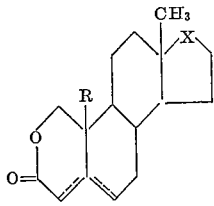

wherein R is selected from the group consisting of hydrogen and methyl, X is selected from the group consisting of carbonyl, β-hydroxymethylene, β-(lower alkanoyl)oxymethylene, α-(lower alkyl)-β-hydroxymethylene, and α-(lower alkyl)-β-(lower alkanoyl)oxymethylene, and the dotted lines indicate the optional presence of a 4,5 or 5,6 double bond.

A further object of this invention is to provide com-

2 pounds of the structural formula

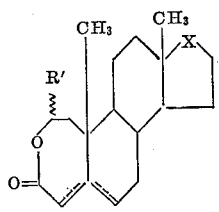

wherein X, R', and the dotted lines have the identical meanings defined supra.

A further object of this invention is to provide compounds of the structural formula

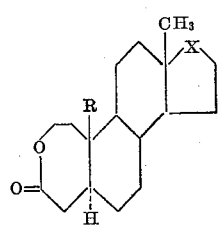

wherein R and X have the identical meanings described supra.

A further object of this invention is to provide compounds of the structural formula

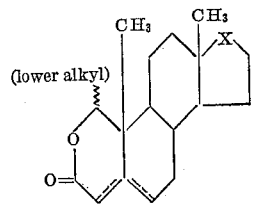

wherein X and the dotted lines have the identical meanings defined supra.

Suitable starting materials for the manufacture of the instant lactones of the androstane series, wherein Z is a

radical, are the 17-oxygenated androst-4-en-3-ones and 17-oxygenated androsta-1,4-dien-3-ones of the structural formula

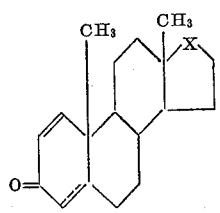

wherein X is a carbonyl, β-hydroxymethylene, or α-(lower alkyl)-β-hydroxymethylene radical, and the dotted line indicates the optional presence of a 4,5 double bond. Reaction of the latter compounds with a mixture of osmium tetroxide and lead tetracetate results in cleavage of the 1,2-double bond to produce the 1,2-seco-A-nor compounds of the structural formula

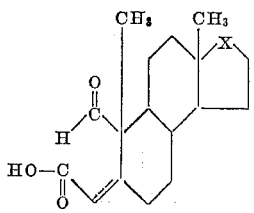

Instead of lead tetracetate, other similar reagents such as sodium periodate or potassium chlorate can be used. The latter process is preferably conducted in an aqueous medium containing a water-miscible alkanoic acid such as acetic, propionic, butyric, isobutyric, valeric, or isovaleric. Reaction temperatures of 0–80° and reaction times of ½–48 hours are satisfactory for this process, although the preferred ranges are 15–35° and 2–24 hours. The reaction times and temperatures are, of course, interdependent so that a higher operating temperature will, in general, result in a shorter reaction time.

Specific examples of the aforementioned novel process are the reaction of 5α-androst-1-ene-3,17-dione, 17β-hydroxy-17α-methyl-5α-androst-1-en-3-one, or 17β-hydroxy-17α-methylandrosta-1,4-dien-3-one in aqueous acetic acid with osmium tetroxide and lead tetracetate to afford 1,17-dioxo-1,2-seco-A-nor-5α-androstan-2-oic acid, 17β-hydroxy - 17α-methyl-1-oxo-1,2-seco-A-nor-5α-androstan-2-oic acid, and 17β-hydroxy-17α-methyl-1-oxo-1,2-seco-A-norandrost-3-en-2-oic acid, respectively.

The novel intermediate 1,2-seco-A-nor compounds are converted to the corresponding instant lactones by reaction with a suitable reducing agent. Typically, the aforementioned 17β-hydroxy-17α-methyl-1-oxo-1,2-seco-A-nor-5α-androstan-2-oic acid and 17β-hydroxy-17α-methyl-1-oxo-1,2-seco-A-norandrost-3-en-2-oic acid are converted to 17β-hydroxy-17α-methyl-2-oxa-5α-androstan-3-one and 17β-hydroxy-17α-methyl-2-oxaandrost-4-en-3-one, respectively, by reduction with sodium borohydride in aqueous sodium hydroxide.

The aforementioned 1,2-seco-A-nor intermediates are converted to the instant 1-alkyl lactones by reaction with the appropriate alkyl organometallic reagent. For example, the instant 17β-hydroxy-17α-methyl-1-oxo-1,2-seco-A-nor-5α-androstan-2-oic acid is allowed to react with ethereal methyl magnesium bromide in tetrahydrofuran, and the resulting adduct is treated with aqueous hydrochloric acid to yield a mixture of the 1α-methyl and 1β-methyl isomers of 17β-hydroxy-1,17α-dimethyl-2-oxa-5α-androstan-3-one, which are separable by virtue of the difference in ease of lactonization of the corresponding hydroxy acids.

The instant lactones of the 5α-estrane series are produced by processes analogous to those aforementioned, utilizing as starting materials 17-oxygenated 5α-estr-1-en-3-ones of the structural formula

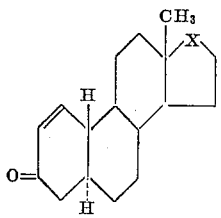

Typically, 17β-hydroxy-17α-methyl-5α-estr-1-en-3-one is treated with osmium tetroxide and lead tetracetate in aqueous acetic acid to yield 17β-hydroxy-17α-methyl-1-oxo-1,2-seco-A-nor-5α-estran-2-oic acid, which is reduced with sodium borohydride in aqueous sodium hydroxide to produce 17β-hydroxy-17α-methyl-2-oxa-5α-estran-3-one.

The instant lactones of the estr-4-ene and estr-5-ene series are manufactured by a sequence of reactions utilizing as the starting material, 6β-19-epoxy-5α-androstane-3β,17β-diol 3,17-diacetate, the preparation of which is described by Bowers et al., Chem. and Ind., 1299 (1960). Hydrolysis of this diester in methanol with aqueous sodium hydroxide followed by chromic acid oxidation of the diol results in 6β,19-epoxy-5α-androstane-3-17-dione. Bromination in tetrahydrofuran followed by dehydrobromination by heating with magnesium oxide in dimethylformamide affords 6β,19-epoxy-5α-androst-1-ene-3,17-dione. Chromic acid oxidation followed by treatment of the resulting 6β-hydroxy-10β-carboxy lactone with aqueous potassium carbonate in methanol followed by acetylation with acetic anhydride in pyridine results in 6β-hydroxy-5α-estr-1-ene-3,17-dione 6-acetate. Reaction of the latter substance with osmium tetroxide and lead tetracetate in aqueous acetic acid produces 6β-hydroxy-1,17-dioxo-1,2-seco-A-nor-5α-estran-2-oic acid 6-acetate. Reduction of this substance with aqueous sodium borohydride followed by chromic acid oxidation yields 6β-hydroxy-2-oxa-5α-estrane-3,17-dione 6-acetate. The latter substance is treated with aqueous alkali to afford the corresponding 6β-ol, which is dehydrated, suitably by heating with phosphorus oxychloride in pyridine or, alternatively, by conversion to the methanesulfonate followed by heating in pyridine, to afford 2-oxaestr-4-ene-3,17-dione. Treatment of this diketone with sodium boro-hydride and aqueous sodium hydroxide followed by acidification with dilute aqueous hydrochloric acid results in 17β-hydroxy-2-oxaestr-4-en-3-one. The corresponding 17α-alkyl-17β-hydroxy lactones are obtained by treating the aforementioned 6β,19-epoxy-5α-androstane-3-17-dione with methanol in the presence of p-toluenesulfonic acid to yield the corresponding 3-dimethyl ketal, which is treated with an alkyl Grignard reagent, then with aqueous hydrochloric acid to afford a 17α-alkyl-17β-hydroxy-6β,19-epoxy-5α-androstan-3-one. The latter substances are subjected to the aforementioned processes to afford the instant 17α-alkyl-17β-hydroxy lactones of the estr-4-ene series. By those processes, for example, 6β-19-epoxy-17β-hydroxy-17α-methyl-5α-androstan-3-one is converted to 17β-hydroxy-17α-methyl-2-oxaestr-4-en-3-one.

The A-ring saturated lactones of this invention, wherein Z is an ethylene group, are obtained by a process utilizing as starting materials compounds of the structural formula

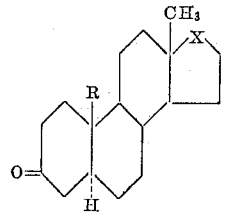

wherein R is hydrogen or a methyl radical, X is β-hydroxymethylene or α-(lower alkyl)-β-hydroxymethylene. Reaction of these substances with isopropenyl acetate affords the corresponding 3-enol acetate, which is treated with ozone, then with zinc dust and finally with sodium hydroxide to afford the intermediate 17-oxygenated-2-oxo-2,3-seco-3-oic acids. Reduction with sodium borohydride in aqueous sodium hydroxide affords the corresponding 2-hydroxy-3-oic acid, which is cyclized by heating at an elevated temperature in a suitable inert solvent to afford the instant 3-oxa-4-ones. These processes are exemplified by the reaction of 17β-hydroxy-17α-methyl-5α-androstan-3-one with isopropenyl acetate and p-toluenesulfonic acid to afford 17α-methyl-5α-androst-2-ene-3,17β-diol 3,17-diacetate. Treatment of this enol acetate with ozone, zinc dust and finally with sodium hydroxide affords 17β-hydroxy-17α-methyl-2-oxo-2,3-seco-5α-androstan-3-oic acid 17-acetate. Reduction with sodium borohydride in aqueous sodium hydroxide produces 2,17β-dihydroxy-17α-methyl-2,3-seco-5α-androstan-3-oic acid, and cyclization of this hydroxy acid by refluxing in tertiary-butylbenzene results in the instant 17β-hydroxy-17α-methyl-3-oxa-A-homo-5α-androstan-4-one.

The compounds of this invention, wherein Z is a

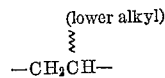

radical are obtained by subjecting starting materials of the structural formula

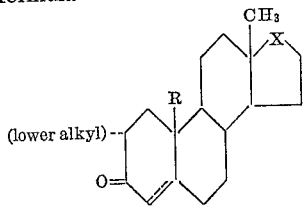

wherein R, X, and the dotted line have the identical meanings defined supra, to treatment with a peracid. The resulting lactones are converted to the corresponding hydroxy-acid by heating with aqueous alkali, followed by acidification. Typically, 17β-hydroxy-2α,17α-dimethyl-5α-androstan-3-one in methylene chloride is treated with peracetic acid in the presence of sodium acetate to afford 17β - hydroxy-2α,17α-dimethyl-3-oxa-A-homo-5α-androstan-4-one. Heating this lactone in methanol with aqueous sodium hydroxide, followed by acidification with dilute hydrochloric acid results in 2β,17β-dihydroxy-2α,17α-dimethyl-2,3-seco-5α-androstan-3-oic acid.

A preferred procedure for the manufacture of the instant compounds of the structural formula

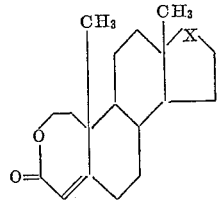

involves reaction of starting materials of the structural formula

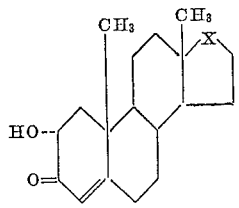

the preparations of which are described by J. S. Baran, J.A.C.S., 80, 1687 (1958), with an oxidizing agent such as lead tetracetate or periodic acid to afford the corresponding 2-oxo-2,3-seco-androst-4-en-3-oic acids. These 2-oxo-3-oic acids are reduced to the corresponding 2-hydroxy-3-oic acids, which are converted to the instant 3-oxaandrost-4a-en-4-ones by refluxing in an inert solvent. For example, 2α,17β-dihydroxy-17α-methylandrost-4-en-3-one in aqueous acetic acid is treated with lead tetracetate to afford 17β - hydroxy-17α-methyl-2-oxo-2,3-seco-androst-4-en-3-oic acid. Reduction with sodium borohydride yields 2,17β-dihydroxy-17α-methyl-2,3-seco-androst-4-en-3-oic acid, which is cyclized by heating in benzene to produce 17β-hydroxy-17α-methyl-3-oxa-A-homo-androst-4a-en-4-one.

The instant compounds of the structural formula

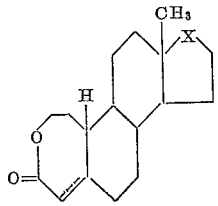

can be manufactured from the corresponding aforementioned 6β-acetoxy-19-nor compounds of the structural formula

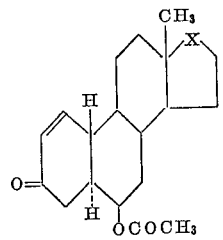

Hydrogenation of the 1,2-double bond of the latter substances followed by reaction with a peracid such as peracetic acid results in the corresponding 3-oxa-4-ones. The latter substances are then treated with dilute alkali to afford the free 6β-ol, which is converted to the methanesulfonate by the aforementioned process. The methanesulfonates upon heating in pyridine afford the corresponding 3-oxa-androst-4a-en-4-ones, which are converted to the corresponding 3-oxa-5α-androstan-4-ones and 3-oxa-5β-androstan-4-ones by catalytic hydrogenation. Specifically, 6β,17β-dihydroxy-17α-methyl-5α-estr 1-en-3-one 6-acetate is reduced with 5% palladium-on-carbon catalyst to yield 6β,17β-dihydroxy-17α-methyl-5α-estran-3-one 6-acetate. Reaction of this subtance in methylene dichloride with aqueous peracetic acid affords 6β,17β-dihydroxy - 17α-methyl-3-oxa-A-homo-5α-estran-4-one 6-acetate. This ester is heated with dilute aqueous sodium hydroxide in methanol to yield the corresponding 6β-ol, which is converted to the 6β-methanesulfonate by reaction with methanesulfonyl chloride in pyridine. Heating the latter substance in pyridine results in 17β-hydroxy-17α-methyl-3-oxa-A-homo-estr-4a-en-4-one. Reduction of the latter substance with hydrogen and 5% palladium-on-carbon catalyst results in 17β-hydroxy-17α-methyl-3-oxa-A-homo-5α-estran-4-one and 17β-hydroxy-17α-methyl-3-oxa-A-homo-5β-estran-4-one.

The 5,6-dehydro lactones of this invention can be manufactured by heating the corresponding 4,5-dehydro compounds with aqueous alkali in methanol, followed by acidification with dilute acid. For example, 17β-hydroxy-17α-methyl-2-oxaandrost-4-en-3-one in methanol is heated at the reflux temperature with 5% aqueous sodium hydroxide, and this mixture is acidified with 10% aqueous acetic acid to produce a mixture of 17β-hydroxy-17α-methyl-2-oxaandrost-5-en-3-one and the Δ⁴ isomer, which are separated chromatographically.

The instant 17-oxo-lactones are obtained by oxidation of the corresponding 17β-hydroxy compounds. Typically, 17β-hydroxy-2-oxa-5α-androstan-3-one in acetone is treated with aqueous chromic acid to yield 2-oxa-5α-androstane-3,17-dione.

Acylation of the secondary hydroxy group of the instant 17β-ols with a lower alkanoic acid anhydride in pyridine produces the corresponding 17β-(lower alkanoates). Typically, 17β-hydroxy-2-oxa-5α-androstan-3-one is treated with acetic anhydride to produce 17β-acetoxy-2-oxa-5α-androstan-3-one.

The instant 17α-(lower alkyl)-17β-(lower alkanoyl)-oxy compounds are obtained by acylation of the corresponding alcohol with an isopropenyl-(lower alkanoate) in the presence of an acidic catalyst. For example 17β-hydroxy-17α-methyl-2-oxaandrostan-3-one is treated with isopropenyl acetate and p-toluenesulfonic acid, resulting in 17β-acetoxy-17α-methyl-2-oxa-5α-androstan-3-one.

Reduction of the instant 4,5-dehydro lactones, suitably with hydrogen in the presence of a hydrogenation catalyst such as palladium results in the corresponding 5α and 5β compounds.

Equivalent to the lactones of this invention are the corresponding hydroxy-acids, with which they are in equilibrium in aqueous solution, and also the alkali metal salts derived therefrom. These relationships are illustrated as follows:

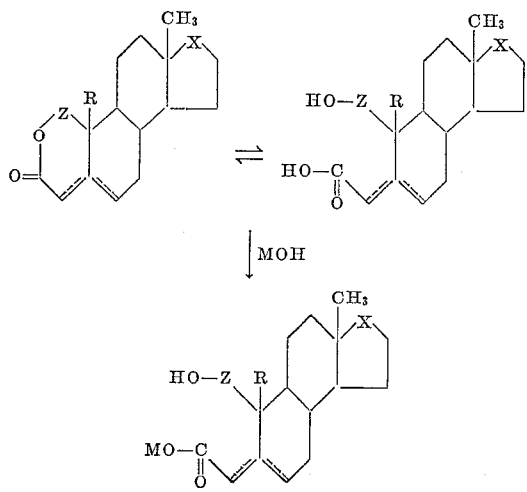

wherein R, X, and the dotted lines have the identical significance as defined supra, and M is the ion of an alkali metal such as sodium or potassium.

Although the instant novel intermediates are represented in the form of an aldehydo-acid, it will be apparent to those skilled in the art that these derivatives actually exist as an equilibrium mixture containing also the corresponding lactol form. This relationship is shown below:

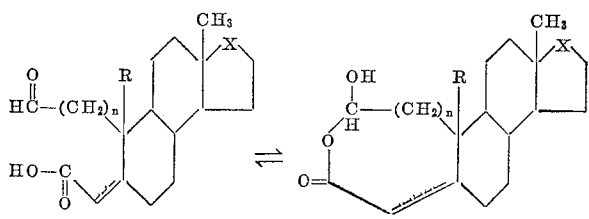

wherein $n$ is 0 or 1 and R, X, and the dotted line have the identical meanings defined supra.

The compounds of this invention are useful in consequence of their valuable pharmacological properties. In particular, they are anabolic agents as is evidenced by their ability to promote nitrogen retention and to promote muscle growth.

The invention will appear more fully from the examples which follow. These examples are set forth by way of illustration only and it will be understood that the invention is not to be construed as limited in spirit or in scope by the details contained therein, as many modifications in materials and methods will be apparent from this disclosure to those skilled in the art. In these examples, temperatures are given in degrees centigrate (° C.). Quantities of materials are expressed in parts by weight unless otherwise noted.

*Example 1*

A mixture of 2.45 parts of 17β-hydroxy-5α-estran-3-one, 2.2 parts of acetic anhydride, and 20 parts of pyridine is allowed to stand at room temperature for about 16 hours, then is diluted with ice water. The resulting precipitate is collected by filtration, washed successively with water, dilute hydrochloric acid, dilute aqueous sodium bicarbonate, dried, and crystallized from aqueous methanol to yield 17β-acetoxy-5α-estran-3-one, M.P. about 104–106°.

A solution of 8 parts of 17β-acetoxy-5α-estran-3-one in 63 parts of glacial acetic acid is cooled by means of an ice bath. To this solution is added portionwise, under nitrogen with stirring, 25 parts of a 2 N bromine in acetic acid solution, and agitation is continued for about 15 minutes longer. The reaction mixture is diluted with water, and the resulting precipitate is collected by filtration, washed successively with dilute aqueous sodium bicarbonate and water, then dried. This solid, containing 17β-acetoxy-2-bromo-5α-estran-3-one, is refluxed in 30 parts of collidine for about 15 minutes, and the mixture is cooled and diluted with 175 parts of ether. The ether solution is washed successively with water, dilute hydrochloric acid, aqueous sodium bicarbonate, and saturated aqueous sodium chloride, dried over anhydrous magnesium sulfate, and evaporated to dryness at reduced pressure. The residue is dissolved in benzene and adsorbed on silica gel. Elution of the chromatographic column with 4% ethyl acetate in benzene affords 17β-acetoxy-5α-estr-1-en-3-one, M.P. 133.5–135.5°.

To a solution of 2 parts of 17β-acetoxy-5α-estr-1-en-3-one in 7.9 parts of methanol is added one part of potassium hydroxide dissolved in 2 parts of water, and the resulting solution is heated at reflux for about one hour. The reaction mixture is cooled, then poured slowly into ice water, and the resulting mixture is extracted with ether. The ether solution is washed with water, dried over anhydrous potassium carbonate and evaporated to dryness in vacuo. Recrystallization of the residue from acetone-petroleum ether affords 17β-hydroxy-5α-estr-1-en-3-one, which displays infrared maxima at about 2.75, 3.4, and 5.95 microns and a maximum in the ultraviolet at 229 millimicrons with an extinction coefficient of about 9800.

*Example 2*

To a solution of 14.5 parts of 17β-hydroxy-17α-methyl-5α-estran-3-one in 150 parts of dimethylformamide is added 0.2 part of p-toluenesulfonic acid monohydrate. The resulting mixture is stirred and treated dropwise with a solution of 8 parts of bromine and 250 parts of dimethylformamide at room temperature over a period of about 12 hours. This reaction mixture is allowed to stand at room temperature for about 12 hours, then is poured slowly into ice water. The resulting precipitate is collected by filtration, washed with water, and dissolved in ether. This ether solution is dried over anhydrous potassium carbonate, then concentrated to dryness to afford 2-bromo-17β-hydroxy-17α-methyl-5α-estran-3-one. This substance is dissolved in 100 parts of dimethylformamide; then 3.9 parts of lithium chloride and 2.3 parts of lithium carbonate are added to the solution. The resulting mixture is heated at reflux with stirring in an atmosphere of nitrogen for about 6 hours, then is cooled and extracted with ether. The ether extract is washed successively with water, dilute hydrochloric acid, aqueous sodium carbonate, and water; dried over anhydrous potassium carbonate, and evaporated to dryness in vacuo. The residue is dissolved in benzene and adsorbed on silica gel. Elution with 15% ethyl acetate in benzene followed by recrystallization from acetone-heptane affords 17β-hydroxy-17α-methyl-5α-estr-1-en-3-one, M.P. 141–142.5°; $[\alpha]_D = +87°$ (chloroform).

*Example 3*

To a solution of 15.2 parts of 17α-ethyl-17β-hydroxy-5α-estran-3-one in 750 parts of dimethylformamide is added 0.5 part of p-toluenesulfonic acid monohydrate, and the resulting mixture is treated dropwise with a solution of 8 parts of bromine in 200 parts of dimethylformamide over a period of about 24 hours. The reaction mixture is poured into a mixture of ice and water, and the resulting precipitate is collected by filtration, washed successively with aqueous sodium bicarbonate and water, and dried to afford 2-bromo-17α-ethyl-17β-hydroxy-5α-estran-3-one. To a solution of the latter substance in 90 parts of dimethylformamide is added 3.9 parts of lithium chloride and 2.25 parts of lithium carbonate, and the resulting mixture is heated at reflux, under nitrogen, for about 6 hours. This reaction mixture is cooled, treated with water, and extracted with ether. The ether solution is washed successively with dilute hydrochloric acid and water, dried over anhydrous potassium carbonate, and concentrated to dryness in vacuo. The residue is dissolved in benzene and adsorbed on silica gel. Elution of the chromatographic column with 8% ethyl acetate in benzene followed by recrystallization from ethyl acetate-heptane results in 17α-ethyl-17β-hydroxy-5α-estr-1-en-3-one, M.P. 170–173°; [α]$_D$=+42.4°.

*Example 4*

To a solution of 8 parts of 5α-androst-1-ene-3,17-dione in 120 parts of acetic acid containing 15 parts of water is added 50 parts of lead tetracetate and 0.75 part of osmium tetroxide. This reaction mixture is stirred for about 4 hours at room temperature, then is stored at room temperature for about 16 hours, and finally is extracted with benzene. The benzene solution is washed with water, and extracted with aqueous potassium bicarbonate. The aqueous extracts are acidified with dilute hydrochloric acid, then extracted with a mixture of ethyl acetate and benzene. This organic extract is washed with water, dried over anhydrous sodium sulfate, and evaporated to dryness at reduced pressure. The resulting residue is dissolved in 20 parts of pyridine, then treated with 10 parts of 20% aqueous sodium bisulfite. This mixture is stirred for about 20 minutes at room temperature, then is diluted with water and extracted with ethyl acetate. The aqueous layer is separated and acidified by means of dilute sulfuric acid, and this acidic mixture is extracted with benzene. The benzene solution is washed with water, dried over anhydrous sodium sulfate, and concentrated to dryness in vacuo to afford 1,17-dioxo-1,2-seco-A-nor-androstan-2-oic acid.

To a solution of 2 parts of 1,17-dioxo-1,2-seco-A-nor-androstan-2-oic acid in 20 parts of water containing 4 parts of 20% aqueous sodium hydroxide is added a solution of 10 parts of sodium borohydride in 80 parts of water. This mixture is stored at room temperature for about 24 hours, then it is washed with ether and acidified with aqueous hydrochloric acid. The resulting mixture is extracted with ethyl acetate-ether, and the organic layer is separated, washed successively with aqueous potassium carbonate and water, dried over anhydrous sodium sulfate, then evaporated to dryness at reduced pressure. The crystalline residue is triturated with ether, then recrystallized from butanone to afford pure 17β-hydroxy-2-oxa-5α-androstan-3-one, M.P. about 198–203°.

*Example 5*

To a solution of 6.36 parts of 17β-hydroxy-17α-methyl-5α-androst-1-en-3-one in 95 parts of acetic acid and 12 parts of water is added 40 parts of lead tetracetate and 0.6 part of osmium tetroxide. This mixture is stored at room temperature for about 24 hours, then is treated with 2 parts of lead tetracetate. Evaporation to dryness at reduced pressure affords a residue, which is extracted with benzene. The benzene extract is washed with water, and extracted with aqueous potassium bicarbonate. The aqueous extract is washed with ether, acidified with dilute sulfuric acid, then extracted with ethyl acetate-benzene. This organic extract is washed with water, dried over anhydrous sodium sulfate, and concentrated to dryness in vacuo. To a solution of the residual crude product in 20 parts of pyridine is added 10 parts of 20% aqueous sodium bisulfite and the mixture is stirred for about 20 minutes at room temperature. This mixture is then diluted with water, washed with ethyl acetate, acidified with dilute sulfuric acid, and finally extracted with benzene. The benzene extract is washed with water, dried over anhydrous sodium sulfate, and evaporated to dryness at reduced pressure to produce crude 17β-hydroxy-17α-methyl-1-oxo-1,2-seco-A-nor-5α-androstan-2-oic acid, which after recrystallization from aqueous isopropyl alcohol, melts at about 166–173° (dec.).

An aqueous slurry of 6 parts of 17β-hydroxy-17α-methyl-1-oxo-1,2-seco-A-nor-5α-androstan-2-oic acid in 200 parts of water is made alkaline to pH 10 by the addition of dilute aqueous sodium hydroxide, then is treated with 6 parts of sodium borohydride. This mixture is allowed to react at room temperature for about 3 hours. Benzene is added and the resulting mixture is acidified carefully with dilute hydrochloric acid. The benzene layer is separated, and the aqueous layer is further extracted with benzene. The combined benzene extracts are washed successively with aqueous potassium bicarbonate and water, dried over anhydrous sodium sulfate, then evaporated to dryness in vacuo. The resulting residue is triturated with ether to afford pure 17β-hydroxy-17α-methyl-2-oxa-5α-androstan-3-one, M.P. about 235–238°; [α]$_D$=−23° (chloroform). It is represented by the structural formula

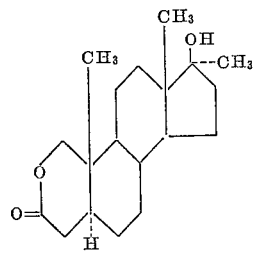

*Example 6*

The substitution of an equivalent quantity of 17α-ethyl-17β-hydroxy-5α-androst-1-en-3-one in the process of Example 5 results in 17α-ethyl-17β-hydroxy-1-oxo-1,2-seco-A-nor-5α-androstan-2-oic acid and 17α-ethyl-17β-hydroxy-2-oxa-5α-androstan-3-one, M.P. about 192–195°. The latter compound is represented by the structural formula

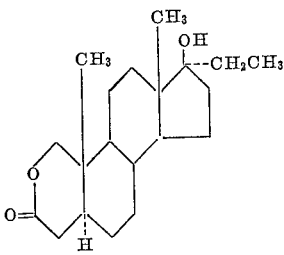

*Example 7*

To a solution of 3 parts of 17β-hydroxy-2-oxa-5α-androstan-3-one in 40 parts of acetone is added dropwise, 3 parts by volume of an aqueous solution, 8 N in chromium trioxide and 8 N in sulfuric acid. The mixture is allowed to stand at room temperature for about 3 minutes, then it is treated with isopropyl alcohol to destroy excess oxidizing agent, and is finally evaporated to dryness under nitrogen. The resulting residue is extracted with ether-benzene, and this extract is washed successively with water, dilute hydrochloric acid, dilute aqueous sodium hydroxide, and water, then dried over anhydrous sodium sulfate, and concentrated to dryness in vacuo to afford crystals of 2-oxa-5α-androstane-3,17-dione, M.P. about 172–173°. Recrystallization from methylcyclohexane-benzene affords a sample which melts at about 173–174°.

*Example 8*

To a solution of 50 parts of androsta-1,4-diene-3,17-dione in 546 parts of tertiary-butyl alcohol and 700 parts of water is added 9 parts of potassium chlorate and 4.5 parts of osmium tetroxide, and the resulting mixture is stored at room temperature for about 15 days, then is concentrated at reduced pressure to afford a dark-colored oil. This oil is extracted with benzene, and the benzene solution is separated, clarified by filtration, washed successively with 5% aqueous sodium hydroxide and water, dried over anhydrous sodium sulfate, and concentrated in vacuo to yield a crystalline residue consisting of a mixture of the isometric 1,2- and 4,5-glycols. Fractional crystallization of this mixture, first from benzene-ether, then from benzene produces pure 4,5-dihydroxyandrost-1-ene-3,17-dione, which melts at about 203–208° and displays infrared maxima at about 2.80, 2.87, 3.40, 5.74, 5.90, and 6.22 microns and also an ultraviolet maximum at about 229 millimicrons with a molecular extinction coefficient of about 9,500, and 1,2-dihydroxyandrost-4-ene-3,17-dione, melting at about 206–210° and characterized by infrared maxima at about 2.80, 2.87, 3.40, 5.74, 5.94, and 6.18 microns, and also an ultraviolet maximum at about 238 millimicrons with a molecular extinction coefficient of about 14,000.

To a solution of 8.4 parts of the latter crude mixture of isomeric glycols in 130 parts of acetic acid and 25 parts of water is added 35 parts of lead tetracetate, and this mixture is stirred at 50–60° for about 1¾ hours, then is diluted with water and is extracted with benzene. The benzene layer is separated, washed successively with water, an aqueous solution 1 molar in potassium carbonate and 1 molar in potassium bicarbonate, and water, dried over anhydrous sodium sulfate, and concentrated to dryness in vacuo. The crystalline residue is recrystallized from benzene to yield 1,17-dioxo-1,2-seco-A-norandrost-3-en-2-oic acid, M.P. about 245–253°. This compound is characterized by an ultraviolet maximum at about 225.5 millimicrons with a molecular extinction coefficient of about 13,700.

To a solution of 4.75 parts of 1,17-dioxo-1,2-seco-A-norandrost-3-en-2-oic acid in 12 parts of chloroform is added successivley a solution of 5 parts of sodium borohydride in 60 parts of water and 5 parts of 10% aqeuous sodium hydroxide. This mixture is stirred at room temperature for about 4 hours, after which time the organic layer is separated by decantation, washed successively with aqueous sodium hydroxide and water, and dried over anhydrous sodium sulfate. The solvent is distilled at reduced pressure to afford the crude product. Recrystallization from isopropyl alcohol results in pure 17β-hydroxy-2-oxaandrost-4-en-3-one, M.P. about 205–207°. It is characterized by an ultraviolet absorption maximum at about 223.5 millimicrons with a molecular extinction coefficient of about 14,000, and is represented by the structural formula

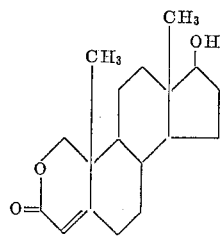

Example 9

A solution of 50 parts of 17β-hydroxy-17α-methylandrosta-1,4-dien-3-one in 546 parts of tertiary-butyl alcohol and 700 parts of water is treated with 8.5 parts of potassium chlorate and 4.25 parts of osmium tetroxide. This reaction mixture is stored at room temperature for about 7 days, then is concentrated in vacuo at room temperature to produce a dark-colored residual oil. Extraction of this oil with chloroform affords an organic solution, which is washed successively with aqueous sodium hydroxide and water, dried over anhydrous sodium sulfate, and evaporated to dryness at reduced pressure to afford a mixture of the isomeric 1,2- and 4,5-glycols. Fractional crystallization from ether-benzene affords 4,5,17β-trihydroxy-17α-methylandrost-1-en-3-one, M.P. about 187–193°, which yields a pure sample melting at about 199–201° after recrystallization from isopropyl alcohol, and exhibits an ultraviolet maximum at about 229.5 millimicrons with a molecular extinction coefficient of about 9,350 and also infrared maxima of about 2.79, 2.87, 3.40, 3.47, 5.91, and 6.18 microns, and 1,2,17β-trihydroxy-17α-methylandrost-4-en-3-one, M.P. about 193–195.5°, which displays an ultraviolet maximum at about 239 millimicrons with a molecular extinction coefficient of about 13,300 and also characteristic infrared maxima at about 5.94 and 6.18 microns.

To 1.338 parts of the latter crude mixture of isomeric glycols in 21 parts of acetic acid and 4 parts of water is added 5.6 parts of lead tetracetate, and this reaction mixture is stirred at 50–60° for about 1¾ hours. Dilution with water followed by extraction with chloroform yields an organic solution, which is washed with an aqueous solution 1 M in potassium carbonate and 1 M in potassium bicarbonate, then is dried over anhydrous sodium sulfate. Evaporation of this solution to dryness and trituration of the resulting residue with benzene produces 17β-hydroxy - 17α - methyl-1-oxo-1,2-seco-A-norandrost-3-en-2-oic acid, M.P. about 250–265°. It displays infrared maxima at about 2.80, 3.00, 3.35, 3.41, 5.84, and 6.10 microns and an ultraviolet maximum at about 226.5 millimicrons with a molecular extinction coefficient of about 13,100.

To a solution of 2.18 parts of 17β-hydroxy-17α-methyl-1-oxo-1,2-seco-A-norandrost-3-en-2-oic acid in 60 parts of chloroform is added successively a solution of 2.18 parts of sodium borohydride in 30 parts of water and 2.5 parts of 10% aqueous sodium hydroxide. This reaction mixture is stirred at room temperature for about 4 hours, and the organic layer is separated by decantation, then washed successively with aqueous sodium hydroxide and water, dried over anhydrous sodium sulfate, and concentrated to dryness at reduced pressure to yield the crude product. Recrystallization from benzene affords pure 17β-hydroxy-17α-methyl - 2 - oxaandrost-4-en-3-one, M.P. about 230–240° (dec.). It displays an ultraviolet absorption maximum at about 223.5 millimicrons with a molecular extinction coefficient of about 12,500, and is represented by the structural formula

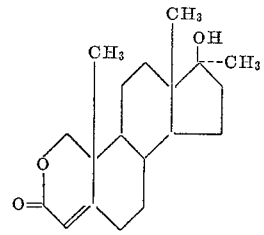

Example 10

The substitution of an equivalent quantity of 17α-ethyl-17β-hydroxyandrosta-1,4-dien-3-one in the procedure of Example 9 results in 17α-ethyl-17β-hydroxy-1-oxo-1,2-seco-A-nor-androst-3-en-2-oic acid, which is converted, by the processes of that example, to 17α-ethyl-17β-hydroxy-2-oxaandrost-4-en-3-one. The latter substance is represented by the structural formula

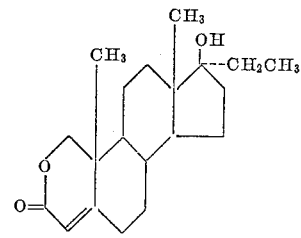

Example 11

To a solution of one part of 17β-hydroxy-2-oxaandrost-4-en-3-one in 16 parts of acetone is added one part by volume of an aqueous solution, 8 N in chromium trioxide and 8 N in sulfuric acid. This reaction mixture is allowed to stand at room temperature for about 5 minutes.

then is treated with one part of isopropyl alcohol and is diluted with water. Extraction with benzene affords an organic solution, which is washed with dilute sodium hydroxide, dried over anhydrous sodium sulfate, and concentrated to dryness to yield 2-oxaandrost-4-ene-3,17-dione, M.P. about 178–183°.

*Example 12*

The substitution of an equivalent quantity of 17β-hydroxy-5α-estr-1-en-3-one in the procedure of Example 4 results in 17β-hydroxy-1-oxo-1,2-seco-A-nor-5α-estran-2-oic acid and 17β-hydroxy-2-oxa-5α-estran-3-one.

*Example 13*

The substitution of an equivalent quantity of 17β-hydroxy-2-oxa-5α-estran-3-one in the procedure of Example 7 results in 2-oxa-5α-estrane-3,17-dione.

*Example 14*

By substituting an equivalent quantity of 17β-hydroxy-17α-methyl-5α-estr-1-en-3-one and otherwise proceeding according to the processes of Example 5, 17β-hydroxy-17α-methyl-1-oxo-1,2-seco-A-nor-5α-estran-2-oic acid and 17β-hydroxy-17α-methyl-2-oxa-5α-estran-3-one are obtained.

*Example 15*

The substitution of an equivalent quantity of 17α-ethyl-17β-hydroxy-5α-estr-1-en-3-one in the procedure of Example 4 results in 17α-ethyl-17β-hydroxy-1-oxo-1,2-seco-A-nor-5α-estran-2-oic acid and 17α-ethyl-17β-hydroxy-2-oxa-5α-estran-3-one.

*Example 16*

A mixture of one part of 6β,19-epoxy-5α-androstane-3β,17β-diol 3,17-diacetate, 80 parts of methanol, and 10 parts of 10% aqueous sodium hydroxide is heated at reflux for about 2 hours. The solution is cooled, concentrated to a small volume under reduced pressure, then diluted with water and extracted with benzene. The benzene solution is concentrated to dryness at reduced pressure. The resulting residue is dissolved in 80 parts of acetone, and this solution is treated dropwise with a small excess of an aqueous solution, 8 N in chromium trioxide and 8 N in sulfuric acid. The excess oxidant is destroyed by the addition of a small quantity of isopropyl alcohol. This mixture is concentrated under nitrogen, then diluted with water and extracted with benzene. The benzene extract is washed successively with aqueous sodium hydroxide and water, dried over anhydrous sodium sulfate, and concentrated at reduced pressure to afford 6β,19-epoxy-5α-androstane-3,17-dione.

*Example 17*

To a solution of one part of 6β,19-epoxy-5α-androstane-3,17-dione in 80 parts of methanol is added 0.2 part of p-toluenesulfonic acid, and the resulting mixture is stored at room temperature for about 16 hours. The mixture is then treated with 0.2 part of sodium methoxide and concentrated to a small volume in vacuo. Water is added and the resulting aqueous mixture is extracted with benzene. The benzene solution is dried over anhydrous sodium sulfate and concentrated to dryness to afford 6β,19-epoxy-5α-androstane-3,17-dione 3-dimethyl ketal.

To a solution of one part of 6β,19-epoxy-5α-androstane-3,17-dione 3-dimethyl ketal in 35 parts of ether is added dropwise 3 parts of volume of 3 M ethereal methyl magnesium bromide. This reaction mixture is kept at room temperature for about 4 hours, then is cooled by means of an ice bath and treated with about 20 parts of 5% aqueous hydrochloric acid. This two-phase mixture is stirred at room temperature for about 2 hours, after which time the organic layer is separated, washed successively with water, 5% aqueous potassium bicarbonate, and water, then dried over anhydrous sodium sulfate and concentrated at reduced pressure to yield 17β-hydroxy-17α-methyl-6β,19-epoxy-5α-androstan-3-one. This substance is characterized by infrared maxima at about 2.85 and 5.85 microns.

*Example 18*

To a solution of 2 parts of 6β,19-epoxy-5α-androstane-3,17-dione in 26.4 parts of tetrahydrofuran is added, at −5° over a period of about 15 minutes, a solution of 1.05 parts of bromine in 3.2 parts of methylene chloride. The reaction mixture is then diluted with water and extracted with benzene. The benzene solution is washed successively with 5% aqueous bicarbonate and water, dried over anhydrous sodium sulfate, and concentrated to dryness under reduced pressure to afford a residue. To 0.08 part of magnesium oxide suspended in 7 parts of dimethylformamide is added, at the reflux temperature, 0.8 part of the latter residue. Refluxing is continued for about 30 minutes, after which time the mixture is poured into about 20 parts of ice water containing one part of concentrated sulfuric acid. This mixture is extracted with benzene, and the benzene solution is washed with water, dried over anhydrous sodium sulfate, and concentrated to dryness in vacuo, to yield 6β,19-epoxy-5α-androst-1-ene-3,17-dione.

To a solution of one part of 6β,19-epoxy-5α-androst-1-ene-3,17-dione in 35 parts of acetone is added 4 parts by volume of an aqueous solution, 8 N in chromium trioxide and 8 N in sulfuric acid. After standing at room temperature for about 2 hours, this mixture is treated with isopropyl alcohol to destroy any excess reagent, then is diluted with water, and extracted with benzene. The benzene solution is concentrated to dryness. A solution of one part of the latter residue in 80 parts of methanol is treated with 10 parts of 10% aqueous potassium carbonate, and this mixture is heated at reflux for about 2 hours. This solution is acidified with excess aqueous hydrochloric acid, then concentrated to a small volume at reduced pressure. Extraction of the resulting residue with benzene affords an organic solution which is washed with water, dried over anhydrous sodium sulfate and concentrated to dryness under reduced pressure to yield 6β-hydroxy-5α-estr-1-ene-3,17-dione.

A mixture of one part of 6β-hydroxy-5α-estr-1-ene-3,17-dione, 10 parts of acetic anhydride, and 20 parts of pyridine is kept at room temperature for about 16 hours, then is diluted with water and extracted with benzene. The organic solution is washed with water, dried over anhydrous sodium sulfate, and evaporated to dryness to yield 6β-hydroxy-5α-estr-1-ene-3,17-dione 6-acetate.

A mixture of one part of 6β-hydroxy-5α-estr-1-ene-3,17-dione 6-acetate, 20 parts of acetic acid, 2 parts of water, 7 parts of lead tetracetate, and 0.1 part of osmium tetroxide is stirred at room temperature for about 24 hours, then is extracted with benzene. The organic extract is washed with water and extracted with aqueous potassium bicarbonate. This alkaline aqueous extract is acidified with dilute hydrochloric acid, then is extracted with ethyl acetate-benzene. This organic solution is evaporated to dryness, then is dissolved in 3 parts of pyridine and treated with 1.5 parts of 20% aqueous sodium bisulfite. The resulting mixture is stirred for about 30 minutes, then is diluted with water and extracted with ethyl acetate. The aqueous layer is acidified with dilute sulfuric acid, then is extracted with benzene. The benzene solution is washed with water, dried over anhydrous sodium sulfate, and evaporated to dryness to yield a residue containing 6β-acetoxy-1,17-dioxo-1,2-seco-A-nor-5α-estran-2-oic acid. To the latter residue is added a solution of one part of sodium borohydride in 50 parts of water, and the resulting mixture is stirred at room temperature for about 4 hours, then is acidified to pH 3 with dilute hydrochloric acid, and is extracted with benzene. The benzene extract is washed successively with aqueous potassium carbonate and water, dried over anhydrous sodium sulfate, and evaporated to dryness to afford 6β-acetoxy-17β-hydroxy-2-oxa-5α-estran-3-one.

To a solution of one part of 6β-acetoxy-17β-hydroxy-2-oxa-5α-estran-3-one in 50 parts of acetone is added a slight excess of an aqueous solution, 8 N in chromium trioxide and 8 N in sulfuric acid. The excess oxidant is destroyed by the addition of isopropyl alcohol, and the mixture is concentrated to dryness. The residue is extracted with benzene, and the benzene extract is washed with water, dried over anhydrous sodium sulfate, and concentrated to dryness to yield 6β-acetoxy-2-oxa-5α-estrane-3,17-dione.

A mixture of one part of 6β-acetoxy-2-oxa-5α-estrane-3,17-dione, 50 parts of methanol, and 10 parts of 10% aqueous sodium hydroxide is heated at reflux for about 5 hours, then is cooled, concentrated to a small volume, and diluted with water. The resulting mixture is extracted with benzene, and the benzene extract is washed with water, dried over anhydrous sodium sulfate, and evaporated to dryness to yield 6β-hydroxy-2-oxa-5α-estrane-3,17-dione.

*Example 19*

To a solution of 10 parts of 6β-hydroxy-2-oxa-5α-estrane-3,17-dione in 100 parts of pyridine is added, at 0°, 7.4 parts of methanesulfonyl chloride. This reaction mixture is stored at room temperature for about 16 hours, then is diluted with water and extracted with benzene. The benzene extract is washed with water, dried over anhydrous sodium sulfate, and evaporated to dryness at reduced pressure. The latter residue is dissolved in 20 parts of pyridine, and the resulting solution is heated at reflux for about 3 hours. The cooled mixture is diluted with water and extracted with benzene. The organic solution is separated, washed with water, dried over anhydrous sodium sulfate, and evaporated to dryness at reduced pressure to yield 2-oxaestr-4-ene-3,17-dione.

*Example 20*

A mixture of one part of 2-oxaestr-4-ene-3,17-dione, 0.3 part of sodium hydroxide, 1 part of sodium borohydride, 40 parts of methanol, and 50 parts of water is stirred at room temperature for about 4 hours, then is acidified with dilute hydrochloric acid and extracted with benzene. The benzene extract is washed successively with aqueous potassium carbonate and water, dried over anhydrous sodium sulfate and evaporated to dryness to yield 17β-hydroxy-2-oxaestr-4-en-3-one.

*Example 21*

By substituting an equivalent quantity of 17β-hydroxy-17α-methyl-6β,19-epoxy-5α-androstan-3-one and otherwise proceeding according to the processes of Example 18, 6β,17β-dihydroxy-17α-methyl-2-oxa-5α-estran-3-one is obtained.

*Example 22*

The substitution of an equivalent quantity of 6β,17β-dihydroxy-17α-methyl-2-oxa-5α-estran-3-one in the procedure of Example 19 results in 17β-hydroxy-17α-methyl-2-oxaestra-4-en-3-one.

*Example 23*

A mixture containing one part of 17β-hydroxy-17α-methyl-2-oxaandrost-4-en-3-one, 10 parts of 5% aqueous sodium hydroxide, and 80 parts of methanol is heated at reflux for about 10 minutes, then is cooled to 0–5° and treated at that temperature with 10 parts of cold 10% aqueous acetic acid. The acidic mixture is diluted with water and extracted with benzene. The organic solution is washed successively with cold 5% aqueous potassium bicarbonate and water, dried over anhydrous sodium sulfate, and concentrated to dryness. The residue is dissolved in benzene and chromatographed on silica gel. Elution with 50% ether in benzene affords 17β-hydroxy-17α-methyl-2-oxaandrost-5-en-3-one.

*Example 24*

The substitution of an equivalent quantity of 17α-ethyl-17β-hydroxy-2-oxaandrost-4-en-3-one in the procedure of Example 23 results in 17α-ethyl-17β-hydroxy-2-oxaandrost-5-en-3-one.

*Example 25*

The substitution of an equivalent quantity of 17β-hydroxy-2-oxaandrost-4-en-3-one in the procedure of Example 23 affords 17β-hydroxy-2-oxaandrost-5-en-3-one.

*Example 26*

The substitution of an equivalent quantity of 2-oxaandrost-4-ene-3,17-dione in the procedure of Example 23 results in 2-oxaandrost-5-ene-3,17-dione.

*Example 27*

By substituting an equivalent quantity of 2-oxaestr-4-ene-3,17-dione and otherwise proceeding according to the processes of Example 23, 2-oxaestr-5-ene-3,17-dione is obtained.

*Example 28*

By substituting an equivalent quantity of 17β-hydroxy-2-oxaestr-4-en-3-one and otherwise proceeding according to the processes of Example 23, 17β-hydroxy-2-oxaestr-5-en-3-one is obtained.

*Example 29*

The substitution of an equivalent quantity of 17β-hydroxy-17α-methyl-2-oxaestr-4-en-3-one in the procedure of Example 23 results in 17β-hydroxy-17α-methyl-2-oxaestr-5-en-3-one.

*Example 30*

A mixture of 2.5 parts of 17β-hydroxy-17α-methyl-5α-androstan-3-one, 25 parts of isopropenyl acetate, and 0.2 part of concentrated sulfuric acid is distilled slowly over a period of about 3 hours. The mixture is then cooled, treated with 0.5 part of sodium acetate, and concentrated to dryness. This residue is extracted with methylene chloride, and the extract is concentrated to dryness at reduced pressure to afford 17α-methyl-5α-androst-2-ene-3,17β-diol 3,17-diacetate.

A solution of 17α-methyl-5α-androst-2-ene-3,17β-diol 3,17-diacetate in 180 parts of ethyl acetate is cooled to −70° and saturated with ozone. The reaction mixture is purged with nitrogen, then is treated with 15 parts of zinc dust and 18 parts of acetic acid containing 15 parts of water. The resulting mixture is stirred at −70° for one hour, at room temperature for one hour, then is diluted with 50 parts of water and stirred for about 30 minutes. The mixture is filtered to remove zinc, and the organic layer is separated, washed successively with water, dilute aqueous sodium bicarbonate, and water, dried over anhydrous sodium sulfate, and evaporated to dryness.

A solution of the latter residue in 150 parts of chloroform is added to a solution of 10 parts of sodium borohydride and 2 parts of sodium hydroxide in 200 parts of water, and the resulting mixture is stirred for about 6 hours. The organic layer is separated, then acidified with dilute hydrochloric acid, and the resulting precipitate is collected by filtration, washed with water, and dried to afford crude 2,17β-dihydroxy-17α-methyl-2,3-seco-5α-androstan-3-oic acid.

This crude product is dissolved in a solution of 10 parts of sodium hydroxide in 200 parts of water, and the resulting solution is heated on the steam bath for about 7 hours, then is cooled and acidified with dilute hydrochloric acid. The crystalline precipitate is collected by filtration, washed with water, dried, then stirred with benezene for about 30 minutes. The crystalline material is collected by filtration, then crystallized as the sodium salt from an aqueous sodium hydroxide solution. The crystalline sodium salt is dissolved in water, and the resulting solution is acidified with dilute hydrochloric acid. The precipitate which forms is collected by filtration and recrystallized from acetone to produce pure 2,17β-dihydroxy-17α-methyl-2,3-seco-5α-androstan-3-oic acid, M.P. about 214–215°.

17

A mixture of one part of 2,17β-dihydroxy-17α-methyl-2,3-seco-5α-androstan-3-oic acid and 175 parts of tertiary-butylbenzene is stirred and distilled slowly over a period of about 3 hours. The mixture is then concentrated to dryness and the residue is extracted with chloroform. The chloroform extract is washed successively with aqueous potassium carbonate and water, dried over anhydrous sodium sulfate, and evaporated to dryness at reduced pressure. Recrystallization of this residue from benzene yields 17β-hydroxy-17α-methyl-3-oxa-A-homo-5α-androstan-4-one, M.P. about 241–245°, which is represented by the structural formula

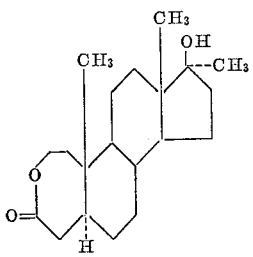

Example 31

The substitution of an equivalent quantity of 17β-hydroxy-5α-androstan-3-one in the procedure of Example 30 affords 2,17β-dihydroxy-2,3-seco-5α-androstan-3-oic acid and 17β-hydroxy-3-oxa-A-homo-5α-androstan-4-one.

Example 32

The substitution of an equivalent quantity of 17β-hydroxy-3-oxa-A-homo-5α-androstan-4-one in the procedure of Example 7 results in 3-oxa-A-homo-5α-androstane-4,17-dione.

Example 33

A mixture of one part of 2α,17β-dihydroxy-17α-methyl-androst-4-en-3-one, 0.8 part of periodic acid dihydrate, 10 parts of pyridine, and 8 parts of water is stored at room temperature for about 24 hours. The resulting crystalline product is collected by filtration, washed with 50% aqueous pyridine, and dried to yield 17β-hydroxy-17α-methyl-2-oxo-2,3-seco-androst-4-en-3-oic acid, M.P. about 219–223° (dec.).

A mixture of one part of 17β-hydroxy-17α-methyl-2-oxo-2,3-seco-androst-4-en-3-oic acid, one part of sodium borohydride, and 10 parts of water is stirred at room temperature for about 16 hours, then is acidified with cold dilute hydrochloric acid. The acidic mixture is extracted with chloroform, and the organic extract is washed with water, dried over anhydrous sodium sulfate, and concentrated to dryness at room temperature under reduced pressure, resulting in 2,17β-dihydroxy-17α-methyl-2,3-seco-androst-4-en-3-oic acid, which melts at 155–162° with decomposition, resolidifies and melts at 182–184°.

A mixture of one part of 2,17β-dihydroxy-17α-methyl-2,3-seco-androst-4-en-3-oic acid and 80 parts of benzene is heated at the reflux temperature for about 15 minutes. The solvent is distilled at reduced pressure to afford 17β-hydroxy-17α-methyl - 3 - oxa - A - homo-androst-4a-en-4-one, M.P. about 182–184°, which is represented by the structural formula

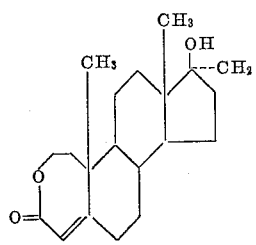

Example 34

The substitution of an equivalent quantity of 2α,17β-dihydroxyandrost-4-en-3-one in the procedure of Example 33 results in 17β-hydroxy-2-oxo-2,3-seco-androst-4-en-3-oic acid, 2,17β-dihydroxy-2,3-seco-androst-4-en-3-oic acid, and 17β-hydroxy-3-oxa-A-homo-androst-4a-en-4-one.

Example 35

The substitution of an equivalent quantity of 17β-hydroxy-3-oxa-A-homo-androst-4a-en-4-one in the procedure of Example 7 results in 3-oxa-A-homo-androst-4a-ene-4,17-dione.

Example 36

The substitution of an equivalent quanity of 17β-hydroxy - 17α-methyl-3-oxa-A-homo-androst-4a-en-4-one in the procedure of Example 23 results in 17β-hydroxy-17α-methyl-3-oxa-A-homo-androst-5-en-4-one.

Example 37

The substitution of an equivalent quantity of 17β-hydroxy-3-oxa-A-homo-androst-4a-en-4-one in the procedure of Example 23 results in 17β-hydroxy-3-oxa-A-homo-androst-5-en-4-one.

Example 38

The substitution of an equivalent quantity of 17β-hydroxy-3-oxa-A-homo-androst-5-en-4-one in the procedure of Example 7 affords 3-oxa-A-homo-androst-5-ene-4,17-dione.

Example 39

A mixture of 1 part of 6β,17β-dihydroxy-17α-methyl-5α-estr-1-en-3-one, 80 parts of ethanol and 0.5 part of 5% palladium-on-carbon catalyst is stirred in a hydrogen atmosphere at atmospheric pressure until one molecular equivalent of hydrogen is absorbed. The catalyst is removed by filtration, and the filtrate is concentrated to dryness to afford 6β,17β-dihydroxy-17α-methyl-5α-estran-3-one.

To a solution of 1 part of 6β,17β-dihydroxy-17α-methyl-5α-estran-3-one in 30 parts of methylene chloride is added 2 parts by volume of 40% peracetic acid in acetic acid and 0.5 parts of dry sodium acetate, and this reaction mixture is stirred at room temperature for about 7 days, then is washed successively with water, aqueous potassium carbonate, and water, dried over anhydrous sodium sulfate, and evaporated to dryness. The residue is dissolved in benzene, chromatographed on silica gel, then eluted with 50% ether in benzene to afford 6β,17β-dihydroxy-17α-methyl-3-oxa-A-homo-5α-estran-4-one.

A mixture of 1 part of 6β,17β-dihydroxy-17α-methyl-3-oxa-A-homo-5α-estran-4-one, 0.74 part of methanesulfonyl chloride and 30 parts of pyridine is stored at 0° for about 16 hours, then is diluted with ice and water. Extraction with benzene affords an organic solution, which is washed with water, dried over anhydrous sodium sulfate, and concentrated to dryness. This residue is dissolved in 50 parts of pyridine, and the resulting solution is heated at reflux for about 3 hours, then is cooled, diluted with water, and extracted with benzene. The benzene layer is separated, washed with water, dried over anhydrous sodium sulfate, and evaporated to dryness to yield 17β-hydroxy-17α-methyl-3-oxa-A-homo-estr-4a-en-4-one.

Example 40

A mixture of 1 part of 17β-hydroxy-17α-methyl-3-oxa-A-homo-estr-4a-en-4-one, 50 parts of ethanol, and 7.5 parts of 5% palladium-on-carbon catalyst is stirred with hydrogen at atmospheric pressure until one molecular equivalent of hydrogen is absorbed. The catalyst is removed by filtration, and the filtrate is concentrated to dryness. The residue is dissolved in benzene, chromatographed on silica gel, and eluted with 50% ether in benzene to yield 17β-hydroxy-17α-methyl-3-oxa-A-homo-5β - estran-4-one and 17β-hydroxy-17α-methyl-3-oxa-A-homo-5α-estran-4-one.

Example 41

To a solution of 7.5 parts of 17β-hydroxy-2α,17α- dimethyl-5α-androstan-3-one in 15 parts of methylene chloride is added 3.3 parts by volume of a solution, prepared by dissolving 1 part of dry sodium acetate in 20 parts by volume of 40% peracetic acid in acetic acid. The mixture is stored at room temperature for about 4 days, then is diluted with benzene, washed successively with 5% aqueous potassium carbonate and water, dried over anhydrous sodium sulfate, and evaporated to dryness. The crystalline residue is triturated with benzene to yield 17β-hydroxy-2α,17α-dimethyl-3-oxa-A-homo-5α-androstan-4-one, M.P. about 214–230°.

*Example 42*

To a solution of one part of 17β-hydroxy-2α,17α-dimethyl-3-oxa-A-homo-5α-androstan-4-one in 16 parts of methanol is added 5% aqueous sodium hydroxide to pH 10, and this reaction mixture is heated on a steam bath for about 5 minutes, then is diluted with 30 parts of water, and is heated for about 30 minutes longer. This mixture is cooled, washed with chloroform, and acidified with dilute hydrochloric acid. The resulting precipitate is collected by filtration, washed with water, dried, and recrystallized from acetone to yield pure 2β-17β-dihydroxy-2α,17α - dimethyl-2,3-seco-5α-androstan-3-oic acid, M.P. about 190° (dec.).

*Example 43*

To a cooled solution of 4.2 parts of 17β-hydroxy-17α-methyl - 1-oxo-1,2-seco-A-nor-5α-androstan-2-oic acid in 133 parts of tetrahydrofuran is added dropwise with stirring 28 parts by volume of 3 M ethereal methyl magnesium bromide. The mixture is stirred for about 30 minutes longer, then is treated dropwise with excess ethanol. This solution is treated with excess dilute hydrochloric acid, then is extracted with chloroform. The organic solution is concentrated to dryness, and the residue is dissolved in 24 parts of methanol, then is treated with 30 parts of 10% aqueous sodium hydroxide. This mixture is heated on the steam bath for about 30 minutes, diluted with water, cooled, and washed with chloroform. The aqueous solution is cooled with ice, then is acidified with acetic acid to pH 5–6. The resulting acidic mixture is immediately extracted with chloroform. The organic layer is washed with aqueous sodium hydroxide, then is concentrated to dryness. Recrystallization from benzene affords 17β-hydroxy-1β,17α-dimethyl-2-oxa-5α-androstan-3-one, M.P. about 190–201°.

The foregoing aqueous sodium hydroxide washings are combined and acidified to pH 2–3 with cold dilute hydrochloric acid. The mixture is extracted with chloroform, and the organic extract is washed successively with aqueous sodium hydroxide and water, dried over anhydrous sodium sulfate, and concentrated to dryness at reduced pressure. The crystalline residue is recrystallized from benzene to yield 17β-hydroxy-1α,17α-dimethyl-2-oxa-5α-androstan-3-one, M.P. about 200–205°.

*Example 44*

The substitution of an equivalent quantity of 17β-hydroxy - 17α - methyl - 1 - oxo - 1,2 - seco - A - norandrost-3-en-2-oic acid in the procedure of Example 43 results in - 17β-hydroxy-1,17α-dimethyl-2-oxaandrost-4-en-3-one.

*Example 45*

The substitution of an equivalent quantity of 17β-hydroxy-1,17α-dimethyl-2-oxaandrost-4-en-3-one in the procedure of Example 23 results in 17β-hydroxy-1,17α-dimethyl-2-oxaandrost-5-en-3-one.

*Example 46*

The substitution of an equivalent quantity of ethyl magnesium bromide in the procedure of Example 43 affords the 1β-ethyl and 1α-ethyl isomers of 1-ethyl-17β-hydroxy-17α-methyl-2-oxa-5α-androstan-3-one.

*Example 47*

A mixture of 1 part of 17β-hydroxy-2-oxa-5α-androstan-3-one, 10 parts of acetic anhydride, and 20 parts of pyridine is allowed to stand at room temperature for about 15 hours, then is diluted with water. This aqueous mixture is extracted with benzene, and the benzene extract is washed successively with dilute hydrochloric acid and water, dried over anhydrous sodium sulfate, and concentrated to dryness in vacuo to yield 17β-acetoxy-2-oxa-5α-androstan-3-one, which displays characteristic infrared maxima at about 5.80 and 8.00 microns.

*Example 48*

The substitution of an equivalent quantity of 17β-hydroxy-2-oxa-5α-estran-3-one in the procedure of Example 47 results in 17β-acetoxy-2-oxa-5α-estran-3-one.

*Example 49*

The substitution of an equivalent quantity of 17β-hydroxy-2-oxaandrost-4-en-3-one in the procedure of Example 47 results in 17β-acetoxy-2-oxaandrost-4-en-3-one.

*Example 50*

The substitution of an equivalent quantity of propionic anhydride in the procedure of Example 47 results in 17β-propionoxy-2-oxa-5α-androstan-3-one, M.P. about 163°.

*Example 51*

A mixture of 1 part of 17β-hydroxy-17α-methyl-2-oxa-5α-androstan-3-one, 100 parts of isopropenyl acetate, and 0.1 part of p-toluenesulfonic acid monohydrate is stirred for about 5 hours, then is diluted with ether, washed with aqueous sodium bicarbonate, and evaporated to dryness in vacuo to afford 17β-acetoxy-17α-methyl-2-oxa-5α-androstan-3-one.

*Example 52*

The substitution of an equivalent quantity of 17β-hydroxy-17α-methyl-2-oxaandrost-4-en-3-one in the procedure of Example 51 results in 17β-acetoxy-17α-methyl-2-oxaandrost-4-en-3-one.

*Example 53*

The substitution of an equivalent quantity of 17β-hydroxy-17α-methyl-2-oxa-5α-estran-3-one in the procedure of Example 51 results in 17β acetoxy-17α-methyl-2-oxa-5α-estran-3-one.

*Example 54*

The substitution of an equivalent quantity of isopropenyl propionate in the procedure of Example 51 results in 17α-methyl-17β-propionoxy-2-oxa-5α-androstan-3-one.

What is claimed is:

1. A compound of the formula

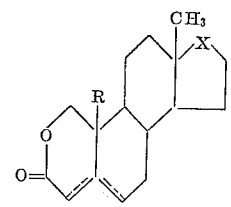

wherein R is selected from the group consisting of hydrogen and methyl, X is selected from the group of radicals consisting of carbonyl, β-hydroxymethylene, α-(lower alkyl)-β-hydroxymethylene, β-(lower alkanoyl)oxymethylene, and α-(lower alkyl)-β-(lower alkanoyl)oxymethylene, and the dotted lines indicate the optional presence of a double bond between carbon atom 5 and an adjacent secondary carbon atom.

2. A compound of the formula

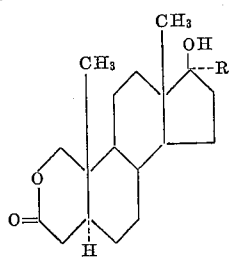

wherein R is an unsubstituted lower alkyl radical.

3. A compound of the formula

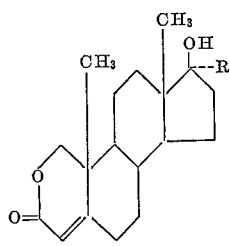

wherein R is an unsubstituted lower alkyl radical.

4. A compound of the formula

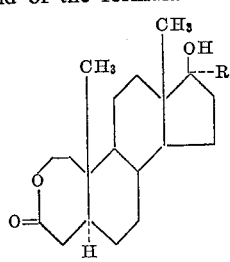

wherein R is an unsubstituted lower alkyl radical.

5. 17β-hydroxy-2-oxa-5α-androstan-3-one.
6. 17β-hydroxy-17α-methyl-2-oxa-5α-androstan-3-one.
7. 17α-ethyl-17β-hydroxy-2-oxa-5α-androstan-3-one.
8. 2-oxa-5α-androstane-3,17-dione.
9. 17β-hydroxy-2-oxaandrost-4-en-3-one.
10. 17β-hydroxy-17α-methyl-2-oxaandrost-4-en-3-one.
11. 2-oxaandrost-4-ene-3,17-dione.
12. 17β-hydroxy-1α,17α-dimethyl-2-oxa-5α-androstan-3-one.
13. 17β-hydroxy-1β,17α-dimethyl-2-oxa-5α-androstan-3-one.
14. 17β-hydroxy-17α-methyl-3-oxa-A-homo-5α-androstan-4-one.
15. 17β-hydroxy-2α,17α-dimethyl-3-oxa-A-homo-5α-androstan-4-one.
16. A compound of the formula

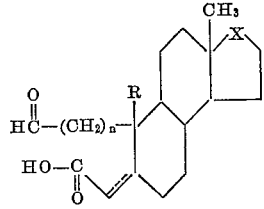

wherein R is selected from the group consisting of hydrogen and methyl, X is selected from the group of radicals consisting of carbonyl, β-hydroxymethylene, and α-(lower alkyl)-β-hydroxymethylene, n is selected from the group consisting of 0 and 1, and the dotted line indicates the optional presence of a 4,5-double bond.

17. 17β-hydroxy-17α-methyl-3-oxa-A-homo-androst-4a-en-4-one.

18. A compound of the formula

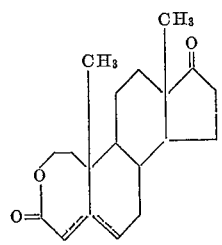

wherein the dotted lines indicate the presence of a double bond between carbon atom 5 and an adjacent carbon atom.

19. A compound of the formula

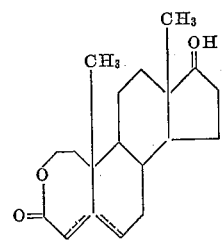

wherein the dotted lines indicate the presence of a double bond between carbon atom 5 and an adjacent carbon atom.

20. A compound of the formula

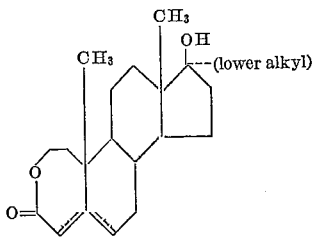

wherein the dotted lines indicate the presence of a double bond between carbon atom 5 and an adjacent carbon atom.

References Cited in the file of this patent

Rull et al.: Bull. Soc. Chim., Fr. (July-December 1958), p. 1579.

UNITED STATES PATENT OFFICE
CERTIFICATE OF CORRECTION

Patent No. 3,128,283  April 7, 1964

Raphael Pappo

It is hereby certified that error appears in the above numbered patent requiring correction and that the said Letters Patent should read as corrected below.

Column 22, lines 26 to 39, for that portion of the formula reading 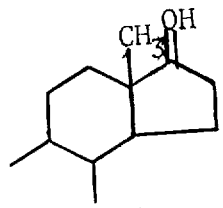 read 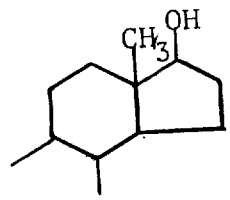

Signed and sealed this 19th day of October 1965.

(SEAL)
Attest:

ERNEST W. SWIDER
Attesting Officer

EDWARD J. BRENNER
Commissioner of Patents